(12) United States Patent
North et al.

(10) Patent No.: US 11,568,424 B2
(45) Date of Patent: Jan. 31, 2023

(54) METHOD AND SYSTEM FOR PRODUCT AUTHENTICATION

(71) Applicant: CPI CARD GROUP—COLORADO, INC., Littleton, CO (US)

(72) Inventors: Keith H. North, Littleton, CO (US); Barry Mosteller, Castle Pines, CO (US)

(73) Assignee: CPI CARD GROUP—COLORADO, INC., Littleton, CO (US)

( * ) Notice: Subject to any disclaimer, the term of this patent is extended or adjusted under 35 U.S.C. 154(b) by 713 days.

(21) Appl. No.: 16/573,692

(22) Filed: Sep. 17, 2019

(65) Prior Publication Data

US 2020/0126093 A1 Apr. 23, 2020

Related U.S. Application Data

(60) Provisional application No. 62/747,563, filed on Oct. 18, 2018.

(51) Int. Cl.
*G06Q 30/00* (2012.01)
*H04W 12/06* (2021.01)
(Continued)

(52) U.S. Cl.
CPC ....... *G06Q 30/0185* (2013.01); *G06F 21/602* (2013.01); *G06Q 30/018* (2013.01); *H04W 4/35* (2018.02); *H04W 12/06* (2013.01)

(58) Field of Classification Search
CPC ... G06Q 30/0185; G06Q 30/018; H04W 4/35; H04W 12/06; G06F 21/602
See application file for complete search history.

(56) References Cited

U.S. PATENT DOCUMENTS 6,308,894 B1 10/2001 Hirai et al.
6,367,011 B1 4/2002 Lee et al.
(Continued)

FOREIGN PATENT DOCUMENTS

CA 2623738 A1 3/2007
CN 105024824 A 11/2015

OTHER PUBLICATIONS

Ungurean et al. (An RFID-Based Anti-Counterfeiting Track and Trace Solution, 2011, pp. 251-268) (Year: 2011).*
(Continued)

*Primary Examiner* — Oleg Korsak
(74) *Attorney, Agent, or Firm* — Dorsey & Whitney LLP

(57) ABSTRACT

Methods and systems for product authentication include the storage of product authenticity data in integrated circuit (IC) chips of verification objects for physical association with authentic products. The IC chips are operable to determine verification data using the stored product authenticity data, and may include private key encryption, private algorithm and/or count processing functionality for verification data determination. A verification server(s) is utilized to receive an inbound message(s) from an electronic device(s) that includes test data obtained by the electronic device(s) from an integrated circuit chip at a product of interest, and in response thereto, to send an outbound message to the electronic device(s) indicative of verification or non-verification of authenticity of the product of interest, based upon identification or non-identification of an association between the test data and product authenticity data. Each outbound message is dependent upon determining the presence of an association utilizing stored data and optional algorithmic and count processing functionality. The electronic device(s) may be a smart phone(s) having a mobile product authentication application downloaded thereto for use in obtaining (Continued)

the test data that may or may not correspond to verification data determinable by a verification object.

26 Claims, 2 Drawing Sheets

(51) Int. Cl.
*G06F 21/60* (2013.01)
*H04W 4/35* (2018.01)

(56) References Cited

U.S. PATENT DOCUMENTS

| | | | |
|---|---|---|---|
| 6,402,028 | B1 | 6/2002 | Graham, Jr. et al. |
| 6,588,673 | B1 | 7/2003 | Chan et al. |
| 7,134,603 | B2 | 11/2006 | Batoha |
| 7,818,085 | B1 | 10/2010 | Chang |
| 2004/0256469 | A1 | 12/2004 | Faenza, Jr. et al. |
| 2006/0133606 | A1* | 6/2006 | Eberwein ............... G06F 21/62 380/30 |
| 2007/0075132 | A1 | 4/2007 | Kean |
| 2007/0106897 | A1* | 5/2007 | Kulakowski ........... H04L 9/083 713/168 |
| 2007/0108298 | A1 | 5/2007 | Kalck et al. |
| 2010/0140344 | A1 | 6/2010 | Toofan et al. |
| 2012/0016793 | A1 | 1/2012 | Peters et al. |
| 2012/0047716 | A1 | 3/2012 | Meeker et al. |
| 2012/0112367 | A1 | 5/2012 | Tarantino |
| 2016/0012498 | A1* | 1/2016 | Prasad ............... G06Q 30/0185 705/26.1 |
| 2016/0036786 | A1* | 2/2016 | Gandhi ................. H04W 12/06 713/168 |
| 2016/0098723 | A1* | 4/2016 | Feeney ................. G06Q 20/065 705/75 |
| 2016/0098730 | A1* | 4/2016 | Feeney .................. G06Q 20/20 705/71 |
| 2016/0195602 | A1* | 7/2016 | Meadow ............. G06F 21/6218 701/517 |
| 2016/0296810 | A1* | 10/2016 | Mandel ................ H04B 5/0062 |
| 2016/0316317 | A1* | 10/2016 | Mayiras ............. H04W 52/283 |
| 2017/0017967 | A1* | 1/2017 | Ming ....................... G06K 1/00 |
| 2017/0091783 | A1* | 3/2017 | Mancevski ...... G06K 19/06028 |
| 2017/0206532 | A1* | 7/2017 | Choi ...................... G06Q 30/02 |
| 2017/0352039 | A1* | 12/2017 | Malkawi .......... G06K 19/06037 |
| 2018/0047032 | A1* | 2/2018 | Wu ..................... G06Q 30/0185 |
| 2018/0108024 | A1* | 4/2018 | Greco .................. H04W 4/029 |
| 2018/0197187 | A1* | 7/2018 | Chung ................. G06K 7/10297 |
| 2018/0357622 | A1 | 12/2018 | Mosteller |
| 2019/0043059 | A1* | 2/2019 | Xie ........................ G06Q 20/40 |

OTHER PUBLICATIONS

NXP (Make Your Products Smarter and More Secure with RFID-NFC, Sep. 2016, 16 pages) (Year: 2016).*
International Search Report & Written Opinion for International Patent Application No. PCT/US2019/056999, dated Jan. 16, 2020 (7 pages).
GSM Card Issuance, MPR5800 Card Production and Personalization, www.datacard.com/smart-card-issuance/mpr5800, Feb. 6, 2017.
SIM Card Issuance, MPR3800 GSM Card Issuance System, www.datacard.com/gsm-card-issuance/mpr3800, Feb. 6, 2017.

* cited by examiner

METHOD AND SYSTEM FOR PRODUCT AUTHENTICATION

CROSS-REFERENCE TO RELATED APPLICATIONS

This application claims priority to U.S. Provisional Application No. 62/747,563, filed Oct. 18, 2018, the contents of which are incorporated herein by reference in its entirety.

FIELD OF THE INVENTION

The present invention relates to product authentication, and more particularly, to the inventive use of verification objects in a system and method for verifying the authenticity of products.

BACKGROUND

The fraudulent misrepresentation of the authenticity of consumer and other products continues to present problems in the marketplace. The problems typically arise when products are labelled, packaged or otherwise marketed so that consumers, including resellers, believe they are purchasing authentic products produced or authorized by a trusted source of the products, when in fact the purchased products are not authentic and do not meet the same quality, design, material and labor sourcing and/or other standards of the authentic products. Further, problems can arise in situations where fraudulently misrepresented component products are purchased and placed in inventory of a purchaser for subsequent incorporation in to a finished assembled product in which the functionality of the component product is critical to the performance of the finished assembled product. The noted problems are particularly pronounced in marketplaces where product distribution sources are difficult to independently qualify for purposes of product authenticity and/or to otherwise hold accountable for non-authenticity of products they distribute.

Unfortunately, consumers of non-authentic products often have little or no practical recourse after purchase. And, even if the party from whom the purchase was made allows for reimbursed return of a non-authentic product, such party often has little or no practical recourse. Moreover, the reputation of the selling party may be damaged, particularly in instances where the disaffected consumer shares the experience with others, e.g. via social media. Further, from a compounded liability standpoint, the purchasers of fraudulent component products may incur additional damages in instances where such components fail in a finished assembled product.

SUMMARY

The present disclosure is directed improved systems and methods for use in the verification of authenticity of products in a manner that facilitates ready implementation and use by consumers. As will be further described, such improved systems and methods entail the inventive use of verification objects that establish a reliable basis for product authentication either prior to product purchase or subsequent to product purchase.

In one embodiment, a method for use in verification of authenticity of a product may include storing product authenticity data in an integrated circuit (IC) chip of a verification object, wherein a microprocessor of the integrated circuit chip is operable to utilize at least the stored product authenticity data to determine verification data. By way of example, the product authenticity data may be stored in non-volatile memory of the integrated circuit chip (e.g. read only memory (ROM)). The product authenticity data stored in the IC chips of the verification objects may be unique in relation to a specific authentic product source of the predetermined authentic products to be associated therewith, and optionally, a specific attribute of such predetermined authentic products (e.g. a product type, model indication, etc.).

In contemplated arrangements, the verification object may be physically associated with an authentic product corresponding with the product authenticity data (e.g. locating the verification object in a supported and preferably secure and/or concealed location on or within the authentic product). By way of example, the physical association may be completed by an authorized source of the authentic product or a designee thereof after the storing by a contracted service provider.

The method may further include receiving an inbound message at a verification server from a remote electronic device, wherein the inbound message comprises test data obtained by the remote electronic device from an integrated circuit chip physically associated with a product of interest. In that regard, the test data may or may not correspond with verification data determinable by the IC chip of the verification object. In contemplated implementations, the remote electronic device may comprise a mobile computing device (e.g. a smart phone with a downloaded mobile product authentic application) operated by a consumer at a location of the product of interest and operable to obtain the test data from the integrated circuit chip of the product of interest via a wireless interface and to send (e.g. automatically) the inbound message.

The method may also include sending an outbound message from the verification server to the remote electronic device in response to receipt of the inbound message, wherein the outbound message is indicative of either verification of authenticity of the product of interest (e.g. when the test data is associable with the product authenticity data), or non-verification of authenticity of the product of interest (e.g. when the test data is not associable with the product authenticity data). In turn, a consumer may be provided with an indication of verification of authenticity or non-verification of authenticity at the electronic device (e.g. a visual indication on a display and/or an audible indication), wherein responsive action may be undertaken. For example, where non-verification of product authenticity is provided prior to purchase, the consumer may forgo purchase of the product of interest. Or, where non-verification of product authenticity is provided after purchase, the consumer may take remedial action, including for example return of the product to the seller thereof and/or removal of the product from inventory (e.g. prior to resale or incorporation incorporated in to another product).

The advantages of such a method are multifold. In one sense, consumers are empowered to independently validate product authenticity at a point of sale, free from reliance upon the supply chain, integrity and/or reputation of the party from whom they are making a purchase. That is, if the authenticity of a product of interest cannot be verified, the consumer may simply forgo the purchase thereof. In another sense, resellers and/or distributors of products believed to be authentic may be benefited by reduced instances in which such parties purchase, resell and/or otherwise distribute counterfeit products of interest. And, in instances involving component products of interest, compounded liability of manufacturers of assembled products incorporating the component products of interest may be averted.

In some implementations, at least the storing step may be completed by a first party (e.g. a party having the necessary resources and security measures to encode secure product authenticity data in IC chips), and at least the step of physically associating the verification object with an authentic product may be completed by a second party. As noted, the second party may be an authorized source or designee thereof for the authentic product, thereby insuring proper association. By way of example, the storing may be completed pursuant to a contract between the first party and said second party.

In contemplated embodiments, after the receiving step and prior to the sending step, the method may include determining whether the test data obtained from the product of interest is associable with said product authenticity data, wherein the outbound message is based upon said determining. In that regard, at least a portion of said determining may be completed at the verification server. Additionally, at least another portion of said determining may completed at a source server controlled by an authorized source of the authentic product or a designee thereof.

The determining step may include first comparing at least a first predetermined portion of one of the test data or data algorithmically determined utilizing the test data, with separately-stored authenticity data corresponding with the product authenticity data stored in the IC chip of the verification object, or data algorithmically determined utilizing such separately-stored authenticity data, to identify the presence or absence of a first predetermined association (e.g. an association between the test data and verification data determinable by the IC chip of the verification object). In turn, a determination that the test data is associable with the product authenticity data may require at least the first comparing to identify the presence of the first predetermined association.

In some embodiments, the method may further comprise maintaining first count data in the memory in the memory of the IC chip of the verification object, wherein the first count data is indicative of a number of times that the product authenticity data stored in the IC chip has been utilized to determine verification data of the IC chip. In turn, the microprocessor of the IC chip of the verification object may be operable to utilize at least the first count data and the stored product authenticity data to determine verification data. For such purposes, the IC chip may include a counter for establishing the first count data.

In such embodiments, the determining may further include second comparing a second predetermined portion of said one of said test data or data that is algorithmically determined utilizing the test data, with separately-stored second count data, or data that is algorithmically determined utilizing such separately-stored second count data, to identify the presence or absence of a second predetermined association (e.g. when the first count data and second count data are equal or otherwise associable in a predetermined manner), wherein the separately-stored second count data is indicative of a number of times that the first comparing has been completed to identify the presence or absence of the first predetermined association. For such purposes, the separately-stored second count data may be maintained and stored via a counter and associated memory (e.g. counter/memory provided at the verification server or source server). In such embodiments, a determination that the test data is associable with the product authenticity data requires the first comparing and the second comparing to identify the presence of the first predetermined association and the second predetermined association, respectively. As may be appreciated, the incorporation of a requirement that first count data and second count data correspond enhances the security of the method since fraudulent attempts to intercept and fraudulently utilize verification data determined at an IC chip of a verification object (e.g. to fraudulently encode a counterfeit product) may be thwarted.

In some embodiments, the storing may further comprise storing a private encryption key in the memory of the IC chip of the verification object, wherein the microprocessor of the IC chip of the verification object is operable to utilize at least the stored product authenticity data to determine verification data that is encrypted utilizing the stored private encryption key with an encryption algorithm. For such purposes, an encryption algorithm may be stored in the memory of the IC chip, wherein the encryption algorithm is applied with the private encryption key to the stored authenticity data to determine the verification data.

In such embodiments, the determining may further comprise decrypting the test data to obtain decrypted test data utilizing a separately-stored private decryption key (e.g. stored at the verification server and/or a source server) with a stored decryption algorithm (e.g. stored at the verification serve and/or a source server) that correspond with said encryption key and said encryption algorithm stored in the IC chip of the verification object, respectively. In turn, the determining may include first comparing at least a first predetermined portion of one of the decrypted test data or data that is algorithmically determined utilizing the decrypted test data, with separately-stored authenticity data indicative of the product authenticity data stored in the IC chip of the verification to identify the presence or absence of the first predetermined association, wherein a determination that said test data is associable with said product authenticity data requires at least the first comparing to identify the presence of the first predetermined association, as described above.

In some implementations, the storing may also include storing a private algorithm in the memory of the IC chip of the verification object (e.g. a private algorithm different from the stored encryption algorithm), wherein the microprocessor of the IC chip of the verification object is operable to first apply the stored proprietary algorithm to at least the stored product authenticity data to obtain the verification data, and to second apply the stored encryption algorithm with the stored encryption key to determined encrypted verification data. In turn, after said decrypting and prior to said first comparing the determining step may further comprise applying another separately-stored private algorithm (e.g. an algorithm that corresponds with said private algorithm stored in the IC chip of the verification object) to said decrypted data to obtain algorithmically-determined data for use in said first comparing.

In such implementations, the method may further comprise maintaining first count data in the memory in the memory of the IC chip of the verification object, as referenced above, wherein the first count data is indicative of a number of times that the product authenticity data has been utilized to determine verification data at the IC chip, wherein the microprocessor of the IC chip of the verification object may be operable to utilize at least the first count data and the stored product authenticity data to determine said verification data. As noted, the IC chip may include a counter for such purposes. In turn, the determining may include second comparing a second predetermined portion of said one of said decrypted test data or data algorithmically-determined utilizing the decrypted test data, with separately-stored second count data to identify the presence or absence of a second predetermined association, wherein the separately-stored second count data is indicative of a number of times that the first comparing has been completed to identify the presence or absence of the first predetermined association with the separately-stored authenticity data, and wherein a determination that said test data is associable with said product authenticity data requires the first comparing and the second comparing to identify the presence of the first predetermined association and the second predetermined association, respectively. As may be appreciated, the combinative use of a private algorithm and encryption techniques further enhances the security of the described embodiment.

In one approach, prior to the storing step, the method may include generating at the verification server the product authenticity data for use in the storing step. In such embodiments, a first party may provide multiple functions, including performance of the generating, storing, receiving and sending steps, as well as at least a portion of the determining step. In conjunction with the generating step, the product authenticity data may comprise or be generated utilizing data provided by an authorized source or designee thereof for an authentic product.

In some embodiments, the storing may also comprise storing account-related data in the IC chip of the verification object, wherein access to the stored account-related data requires presentation of issuer key data to the integrated circuit chip of the verification object at a point-of-sale (POS) location of an authentic product, separate from said contactless interface with the electronic device, wherein the stored account-related data may be indicative of a benefit to be provided to a purchaser of the authentic product.

In some embodiments, the verification server and the electronic device may each be interconnectable to a communications network at remotely located nodes of the communication network, wherein the in-bound message is received by the verification server and the outbound message is sent by the verification server via the communications network. In turn, the communications network may include the Internet and the electronic device may be a mobile computing device.

In the later regard, the method may also include providing a mobile product authenticity application for download and storage by mobile computing devices. The mobile product authentication application may be provided for download at a mobile application server controlled by an authentic product source or designee thereof. In contemplated embodiments, the receiving, determining and sending steps may require use of the mobile product authenticity application at said mobile computing device used to obtain the test data.

The mobile product authentication application may be operable to configure the mobile computing device to:

authenticate the mobile computing device to the IC chip of the verification object via a contactless interface;

obtain as said test data the verification data determinable by the microprocessor of the verification object as physically associated with the product of interest via the contactless interface;

send a message corresponding with the inbound message comprising the verification data to the verification server via the communications network;

receive a message corresponding with the outbound message from the verification server via the communications network; and/or, provide a user-discernable output indicative of one of verification of authenticity of the product of interest or non-verification of authenticity of the product of interest (e.g. a visual output at a display and/or a speaker output of the electronic device).

Verification objects employable in the present invention include those that comprise a substrate to which the IC chip of the verification object is supportably interconnected, and an antenna supportably interconnected to the substrate and operatively interconnected or interconnectable to the integrated circuit chip of the verification object to receive/transmit wireless RF signals. In turn, the mobile computing device may be operable for near field communications with said integrated circuit chip of the verification object via the antenna thereof.

In another embodiment, a system for use in verification of authenticity of a product may include at least one encoding device for storing product authenticity data in memory of an integrated circuit (IC) chip of a verification object to be physically associated with a predetermined authentic product, and at least one secure encoding server for providing the authenticity data to the at least one encoding device. The system may further comprise at least one verification server (e.g. controlled by a first party), interconnectable to a communications network (e.g. the Internet), for receiving an inbound message via the communications network from at least one electronic device that includes test data obtained by the at least one electronic device from a product of interest, and for sending an outbound message via the communications network to the electronic device indicative of verification or non-verification of product authenticity of the product of interest when the test data is associable with the product authenticity data.

In contemplated embodiments, the at least one verification server may include at least one processor configurable by preprogrammed instructions (e.g. stored in associated memory) for first comparing at least a first predetermined portion of one of the test data or data that is algorithmically determinable utilizing the test data (e.g. by applying a predetermined decryption algorithm and/or a predetermined private algorithm stored in associated memory to the test data), with one of separately-stored authenticity data indicative of the product authenticity data or data that is algorithmically determinable utilizing separately-stored authenticity data (e.g. by applying a predetermined decryption algorithm and/or a predetermined private algorithm stored in associated memory to separately-stored authenticity data) to identify the presence or absence of a first predetermined association, wherein a determination that the test data is associable with the product authenticity data requires the identification of the presence of the first predetermined association.

In one approach, the separately-stored authenticity data may be stored at the at least one verification server (e.g. controlled by the first party). In another approach, the separately-stored authenticity data may be stored at one or more source server (e.g. controlled by a second party), separate from the at least one verification server, wherein the at least one verification server is operable to receive the separately-stored authenticity data from the one or more source server.

In some implementations the IC chip of the verification object may operable to determine (e.g. via an on-chip microprocessor) verification data using the product authenticity data and first count data (e.g. stored in the memory thereof) that is indicative of a number of times that the product authenticity data has been utilized by the IC chip to determine verification data, and wherein the at least one processor of the at least one verification server is further configurable by preprogrammed instructions (e.g. stored in associated memory) for second comparing a second predetermined portion of one of the test data or said data that is algorithmically determinable utilizing the test data, with one of separately-stored second count data or data that is algorithmically determined by the at least one verification server utilizing separately-stored second count data (e.g. by applying a predetermined decryption algorithm and/or a predetermined private algorithm stored in associated memory to separately-stored second count data) to identify the presence or absence of a second predetermined association, wherein the separately-stored second count data is indicative of a number of times that the first comparing has been completed to indicate the presence or absence of the first predetermined association with the corresponding separately-stored authenticity data, and wherein a determination that the test data is associable with the product authenticity data requires the identification of the presence of the first predetermined association and the second predetermined association.

In one approach, the separately-stored second count data may be maintained and stored at the at least one verification server (e.g. controlled by the first party). In another approach, the separately-stored second count data may be maintained and stored at one or more source server (e.g. controlled by a second party), separate from the at least one verification server, wherein the at least one verification server is operable to receive the separately-stored authenticity data from the one or more source server.

In some embodiments, the IC chip of the verification object may be operable (e.g. via an on-chip microprocessor) to utilize the stored product authenticity data, and optionally, first count data (e.g. stored in the memory), to determine verification data that may be encrypted utilizing an encryption key stored in the memory with an encryption algorithm, and wherein the at least one processor of the at least one verification server may be configurable by preprogrammed instructions (e.g. stored in associated memory) to decrypt the test data to obtain decrypted test data utilizing a separately-stored private decryption key with a decryption algorithm that correspond with the encryption key and the encryption algorithm, respectively, wherein the decrypted test data may be utilized in the first comparing by the at least one processor.

In contemplated implementations, the IC chip of the verification object may be operable to utilize the stored product authenticity data to determine verification data (e.g. via an on-chip microprocessor), wherein the electronic device is a mobile computing device, and further comprising a mobile application server operable to provide a mobile product authentication application to the mobile computing device. In turn, the mobile product authentication application may be operable to configure the mobile computing device to:

authenticate the mobile computing device to the IC chip of the verification object via a contactless interface;
obtain the verification data as test data from the IC chip as physically associated with the product of interest via said contactless interface;
send a message corresponding with the inbound message comprising the verification data to a mobile application server via the communications network;
receive a message corresponding with the outbound message verification server from the mobile application server via the communications network; and/or,
provide a user-discernable output indicative of one of verification of authenticity of the product of interest or non-verification of authenticity of the product of interest.

Features of the method and system embodiments separately described herein may be combinatively employed. In turn, numerous additional features and advantages of the present invention will become apparent to those skilled in the art upon consideration of the embodiment descriptions provided hereinbelow.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
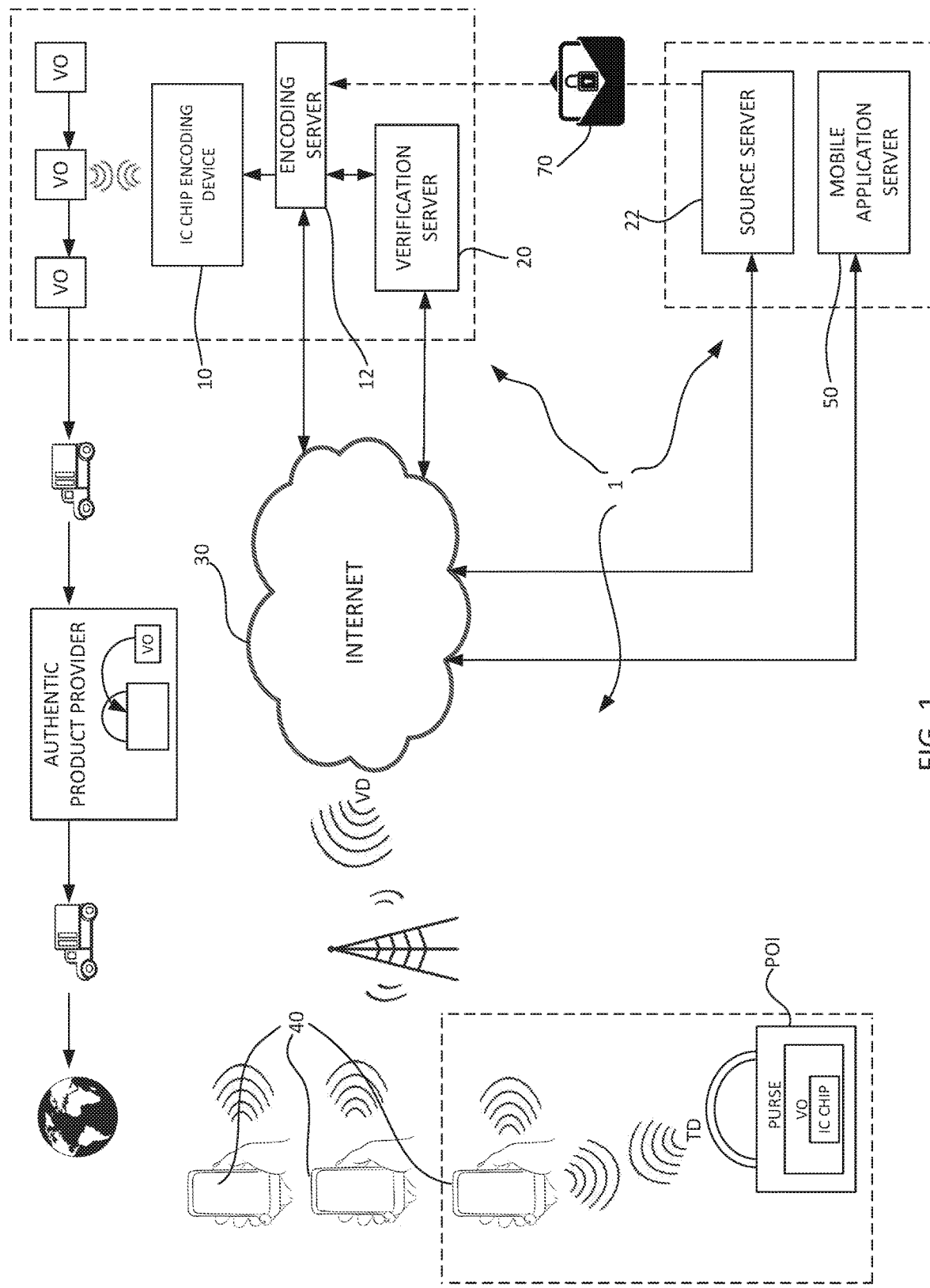
FIG. 1 illustrates an embodiment of a system for use in the verification of authenticity of products.

The system embodiment 1 shown in FIG. 1 comprises one or more encoding device(s) 10 operable for storing product authenticity data and additional data described below in memory (e.g. non-volatile, read only memory) of integrated circuit (IC) chips of verification objects (VO) to be physically associated with predetermined authentic products (AP). Such data may be provided to the encoding device(s) 10 by one or more secure encoding server(s) 12. By way of example, the product authenticity data stored in the IC chips of the verification objects may be unique in relation to a specific authentic product source of the predetermined authentic products to be associated therewith, and optionally, to a specific attribute of such predetermined authentic products.

As shown, after the storage of data in the IC chips of the verification objects, the verification objects (VO) may be provided (e.g. transported) to an authentic product provider for physical association with authentic products (e.g. purses). In turn, the authentic products may be provided (e.g. transported) for distribution to the marketplace.

The system 1 may further comprise one or more verification server(s) 20 interconnectable to a communications network 30, e.g. the Internet, for receiving inbound messages (IM) from one or more electronic device(s) 40 that include test data (TD) obtained by the electronic device(s) 40 from products of interest (POI), and in response to the receiving, for sending outbound messages (OM) to the electronic device(s) 40 indicative of verification or non-verification of product authenticity of the products of interest (Y/N Verification). In the later regard, verification of product authenticity may be provided when test data is associable with product authenticity data, thereby indicating that a corresponding product of interest is an authentic product.

The encoding device(s) 10 and verification objects (VO) may be provided for contactless communications therebetween. For example, both the verification objects and encoding device(s) 10 may each comprise an antenna for radio frequency (RF) communications therebetween, wherein the product authenticity data and additional data may be encoded in the IC chips of the verification objects. The verification objects may each include an IC chip and an antenna supportably interconnected to the same or opposing sides of a substrate, wherein the IC chip and antenna are electrically interconnected. In one approach, the verification objects may be produced utilizing method and system features described in PCT Patent Application No. PCT/US2017/019175 having International Publication No. WO 2017/147321, the entirety of which is hereby incorporated by reference.

In one approach, the product authenticity data may be securely stored at one or more source server(s) 22 and securely provided to the encoding server(s) 12 via the communications network 30 and/or on data storage media 70 via secure transport modalities. The product authenticity data may be encrypted in a predetermined manner for provision to the encoding server(s) 12 and decrypted at encoding server(s) 12 in a predetermined complimentary manner. In another approach, the product authenticity data may be securely stored at one or more of the verification server(s) 20 and securely provided to the encoding server(s) 12.

The verification server(s) 20 may be operable to process the test data obtained from a product of interest to determine whether the test data is associable with the product authenticity data stored in the IC chip of one or more of the verification objects, wherein the outbound message is based at least in part upon such determination. In that regard, the verification server(s) 20 may comprise one or more computer processor(s) configurable by preprogrammed instructions for first comparing at least a first predetermined portion of one of the test data or data that is algorithmically determined by the verification server(s) 20 utilizing the test data, with separately-stored authenticity data indicative of product authenticity data stored in the IC chip of one or more of the verification objects, or data that is algorithmically determined by the verification server(s) 20 utilizing such separately-stored authenticity data, to identify the presence or absence of a first predetermined association (e.g. indicating an association between the test data and verification data determinable at one or more of the verification objects), wherein a determination that the test data is associable with said product authenticity data requires the identification of the presence of the first predetermined association. In one approach, the separately-stored authenticity data may be stored at the verification server(s) 20. In another approach, the separately-stored authenticity data may be stored at one or more source server(s) 22 controlled by a second party (e.g. an authorized source of authentic products or designee thereof), separate from the verification server(s) 20, wherein the verification server(s) 20 is operable to receive the separately-stored authenticity data from the source server(s) 22, e.g. via the communications network 30.

In some embodiments, the IC chip of each verification object may be provided to maintain first count data in the memory of the IC chip, wherein the first count data is indicative of a number of times that the product authenticity data stored in the IC chip has been utilized to determine corresponding verification data, and wherein the microprocessor of the IC chip is operable to utilize at least the first count data and the stored product authenticity data stored in the IC chip to determine the verification data. For such purposes, each IC chip may include a counter for establishing the first count data. In such embodiments, the computer processor(s) of the verification server(s) 20 may be further configurable by preprogrammed instructions for second comparing a second predetermined portion of said one of said test data or said algorithmically-determined data that is algorithmically determined utilizing the test data, with separately-stored second count data, or data that is algorithmically determined by the verification server(s) 20 utilizing such separately-stored second count data, to identify the presence or absence of a second predetermined association (e.g. when the first count data and second count data are equal or otherwise associable in a predetermined manner), wherein the separately-stored second count data is indicative of a number of times that the first comparing has been completed to indicate the presence or absence of the first predetermined association with the corresponding separately-stored stored authenticity data. For such purposes, the separately-stored stored/second count data may be maintained via a counter and stored via associated memory (e.g. counter/memory provided at verification server(s) 20 or source server(s) 22). In such embodiments, a determination that the test data is associable with the product authenticity data stored in one of the IC chip of one or more of the verification objects requires the first comparing and the second comparing to identify the presence of the first predetermined association and the second predetermined association, respectively. As may be appreciated, the incorporation of a requirement that first count data and second count data correspond enhances the security of the method since fraudulent attempts to intercept and fraudulently utilize verification data determined at an IC chip of a verification object of an authentic product (e.g. to fraudulently encode an IC chip of a counterfeit product) may be thwarted.

In some embodiments, the encoding device(s) 10 may be operable for storing a private encryption key in the memory of the IC chip of the verification objects, wherein the microprocessor of the IC chip of the verification objects is operable to utilize at least the stored product authenticity data, and optionally first count data if stored/maintained, to determine verification data that is encrypted utilizing the stored private encryption key with an encryption algorithm. For such purposes, the encryption algorithm may also be stored in the memory of the IC chip, wherein the encryption algorithm is applied with the private encryption key to the stored authenticity data, optionally first count data if stored/maintained, to determine the verification data. In such embodiments, the computer processor(s) of the verification server(s) 20 may be further configurable by preprogrammed instructions to decrypt the test data to obtain decrypted test data utilizing a separately-stored private decryption key with a stored decryption algorithm that correspond with the encryption key and the encryption algorithm stored in the IC chip of one or more of the verification objects, respectively. In turn, the first comparing by the verification server(s) 20 may comprise a comparison of at least a first predetermined portion of one of the decrypted test data, or data that is algorithmically determined utilizing the decrypted test data, with separately-stored authenticity data indicative of product authenticity data stored in the IC chip of one or more of the verification objects, or data that is algorithmically determined by the verification server(s) 20 utilizing separately-stored authenticity data, to identify the presence or absence of a second predetermined association (e.g. when the first count data and second count data are equal), as otherwise described.

Further, in embodiments where first count data is stored/maintained in the IC chip of the verification objects and separately-stored second count data is maintained/stored at verification server(s) 20 or source server 22, optional second comparing by the verification server(s) 20 may comprise a comparison of a second predetermined portion of the decrypted test data, or data that is algorithmically determined utilizing the decrypted test data, with separately-stored second count data, or data that is algorithmically determined by the verification server(s) 20 utilizing separately-stored second count data, to identify the presence or absence of a second predetermined association (e.g. when the first count data and second count data are equal), as otherwise described.

In some implementations, the encoding device(s) 10 may be operable for storing a private algorithm in the memory of the IC chip of the verification objects (e.g. a private algorithm different from a stored encryption algorithm), wherein the microprocessor of the IC chip of each of the verification objects is operable to first apply the stored private algorithm to at least the stored product authenticity data to obtain the verification data, and optionally, to second apply a stored encryption algorithm with a stored encryption key to determine encrypted verification data. In turn, prior to the first comparing by the verification server(s) 20, and decryption by verification server(s) if the test data is encrypted, the computer processor(s) of the verification server(s) 20 may be further configurable by preprogrammed instructions to apply another separately-stored private algorithm (i.e that corresponds with said private algorithm) to obtain algorithmically-determined data for use in the first comparing by the verification server(s).

As indicated, the electronic device(s) 40 may be operable to obtain test data from product(s) of interest, to send inbound messages comprising the test data to the verification server(s) 20 via the communications network 30, and to receive outbound messages from the verification server(s) that provide an indication of verification or non-verification of authenticity of product(s) of interest. The test data may be obtained from integrated circuit chips associated with product(s) of interest and may or may not correspond with the verification data determinable by the microprocessor of the IC chip of one or more of the verification objects. The electronic device(s) 40 may be mobile computing device(s) operable for contactless obtainment of test data from products of interest and wireless interconnection with the communications network 30 for sending/receiving the messages to/from verification server(s) 30.

In particular, the electronic device(s) 40 may be a smart phone(s) wirelessly interconnectable to the Internet 30. In turn, the electronic devices(s) 40 may be operable to download a mobile product authenticity application provided at one or more mobile application server(s) 50 via the Internet 30 for use in obtainment of the test data from product(s) of interest. The mobile product authentication application may be operable to configure an electronic device 40 to:

authenticate the electronic device 40 to the IC chip of one or more of the verification objects via a contactless interface;

obtain as the test data the verification data determinable by the microprocessor of the IC chip of one or more of the verification objects as physically associated with a product of interest;

send a message corresponding with the inbound message and comprising the verification data as the test data to the verification server(s) 20 via the communications network 30;

receive a message corresponding with the outbound message from the verification server(s) 20 via the communications network 30; and, provide a user-discernable output indicative of one of verification of authenticity of the product of interest or non-verification of authenticity of the product of interest (e.g. a visual output at a display of the electronic device 40 and/or an audible output at a speaker output of the electronic device 40).

In some embodiments, the IC chip encoding device 10, encoding server 12 and verification server(s) 20 may be operated and/or controlled by a first party that is a verification object source and/or designee thereof. Further, in some implementations, the optional source server(s) 22 and mobile application server(s) 50 may be operated and/or controlled by a second party that is a source of an authentic product or designee thereof.

Figure 2:
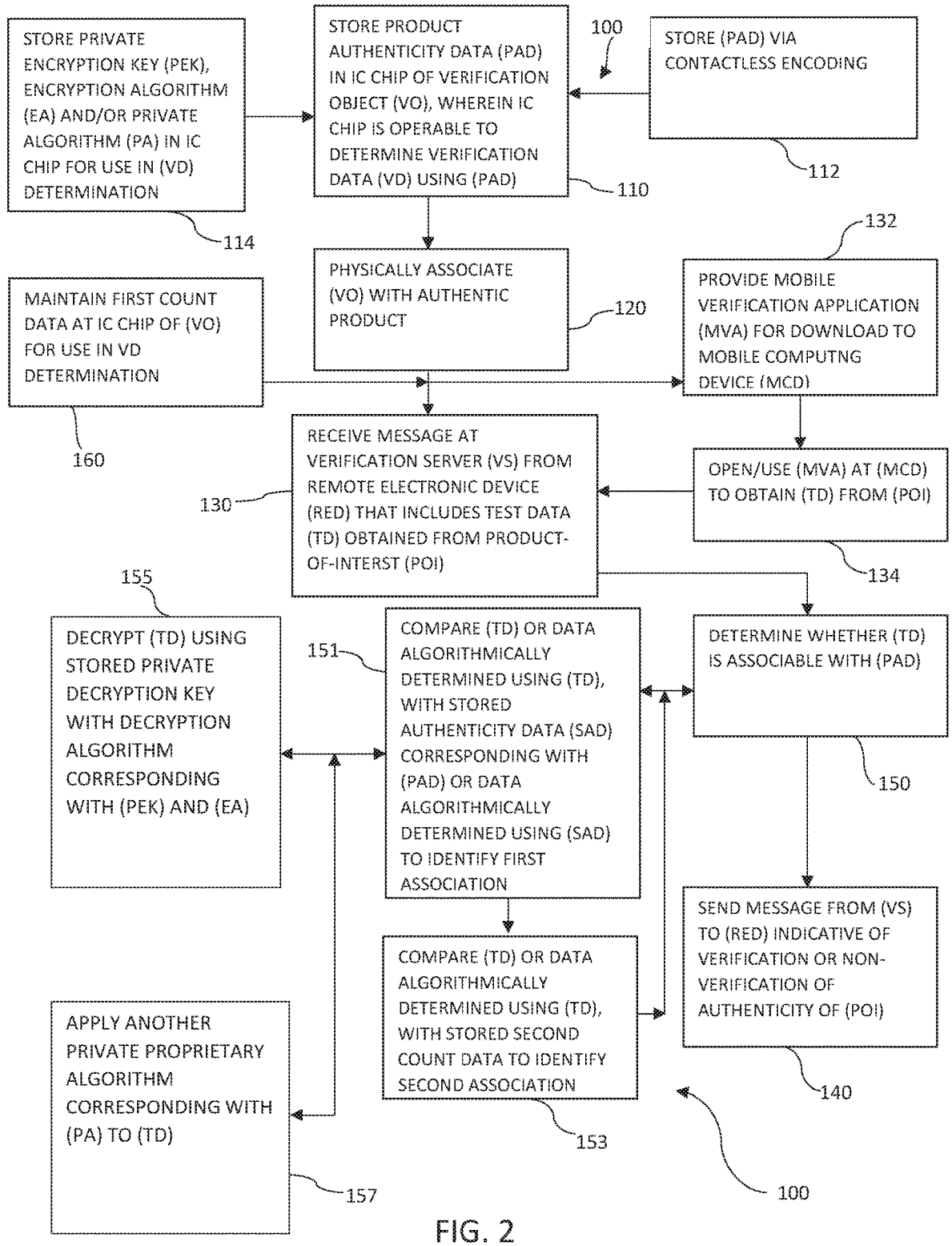
FIG. 2 illustrates an embodiment of a method for use in the verification of authenticity of products.

The method embodiment 100 shown in FIG. 2 includes storing 110 product authenticity data in an integrated circuit (IC) chip of a verification object, wherein a microprocessor of the IC chip is operable to utilize at least the stored product authenticity data to determine verification data. By way of example, the product authenticity data may be stored in non-volatile memory of the IC chip (e.g. read only memory) via contactless encoding 112 utilizing radio frequency (RF) signals.

In some arrangements, storing 110 may also include storing 114 a private encryption key, an encryption algorithm and/or a private algorithm in the memory of the IC chip (e.g. encoding 112). In contemplated arrangements, the verification object may be physically associated (120) with an authentic product corresponding with the product authenticity data (e.g. locating the verification object in a supported and preferably secure and/or concealed location on or within the authentic product). The storing 110 and associating 120 may be completed by different parties at different locations.

The method may further include receiving (130) an inbound message at a verification server from a remote electronic device, wherein the inbound message comprises test data obtained by the remote electronic device from an integrated circuit chip physically associated with a product of interest, e.g. via a contactless interface therebetween, wherein the test data may or may not correspond with verification data determinable at the IC chip of the verification object. In turn, the method may include sending (140) an outbound message from the verification server to the electronic device, in response to receipt of the inbound message, that provides an indication of verification or non-verification of authenticity of the product of interest. In relation to step 140, the method may include determining 150 whether the test data received in the inbound message from the electronic device in step 130 is associable with the product authenticity data stored in the IC chip of the verification object in step 110.

In contemplated implementations, the remote electronic device may comprise a mobile computing device (e.g. a smart phone) operated by a consumer at a location of the product of interest. In turn, the method may include providing (132) a mobile verification application for download to the mobile computing device, wherein upon opening/use (134) of the mobile verification application at the product of interest, the mobile verification application is operable to generate and send the inbound message to the verification server in step 130.

The determining step 150 may include first comparing (151) at least a first predetermined portion of one of the test data or data algorithmically determined utilizing the test data, with separately-stored authenticity data that corresponds with the product authenticity data stored in step 110, or data algorithmically determined utilizing such separately-stored authenticity data, to identify the presence or absence of a first predetermined association (e.g. indicating an association between the test data and verification data determinable at the verification object), wherein a determination that said test data is associable with said product authenticity data requires at least the first comparing to identify the presence of the first predetermined association.

In some embodiments, the method may further comprise maintaining 160 first count data in the memory in the memory of the IC chip of the verification object, wherein the first count data is indicative of a number of times that the product authenticity data stored in the IC chip has been utilized to determine verification data, wherein the microprocessor of the IC chip of the verification object is operable to utilize at least the first count data and the stored product authenticity data to determine said verification data. For such purposes, the IC chip may include a counter for establishing the first count data. In such embodiments, the determining 150 may further include second comparing 153 a second predetermined portion of said one of said test data or data that is algorithmically determined utilizing the test data, with separately-stored second count data to identify the presence or absence of a second predetermined association (i.e. when the first count data and second count data are equal or otherwise associable in a pre-determined manner), wherein the stored second count data is indicative of a number of times that the first comparing has been completed to indicate the presence or absence of the first predetermined association. For such purposes, the second count data may be maintained via a counter (e.g. a counter provided at the verification server or source server). In such embodiments, a determination that the test data is associable with said product authenticity data requires the first comparing 151 and the second comparing 153 to identify the presence of the first predetermined association and the second predetermined association, respectively. As may be appreciated, the incorporation of a requirement that first count data and second count data correspond enhances the security of the method since fraudulent attempts to intercept and fraudulently utilize verification data determined at an IC chip of a verification object of an authentic product (e.g. to fraudulently encode a counterfeit product) may be thwarted.

As noted, the storing 112 may further comprise storing 114 a private encryption key in the memory of the IC chip of the verification object, wherein the microprocessor of the IC chip of the verification object is operable to utilize at least the stored product authenticity data to determine verification data that is encrypted utilizing the stored private encryption key with an encryption algorithm. For such purposes, an encryption algorithm may be stored 114 in the memory of the IC chip, wherein the encryption algorithm is applied with the private encryption key to the stored authenticity data to determine the verification data. In such embodiments, the determining 150 may further comprise decrypting 155 the test data to obtain decrypted test data utilizing a stored private decryption key with a decryption algorithm that correspond with said encryption key and said encryption algorithm, respectively. In turn, the determining 150 may include first comparing 151 at least a first predetermined portion of one of the decrypted test data or algorithmically-determined data that is algorithmically determined utilizing the decrypted test data, with one of a plurality of stored authenticity data to identify the presence or absence of a first predetermined association with one of the plurality of secure authenticity data, wherein a determination that said test data is associable with said product authenticity data requires at least the first comparing 151 to identify the presence of the first predetermined association, as described above.

As noted, the storing 110 may also include storing 112 a private algorithm in the memory of the IC chip of the verification object, wherein the microprocessor of the IC chip of the verification object is operable to first apply the stored private algorithm to at least the stored product authenticity data to obtain the verification data, and to second apply the encryption algorithm with the stored encryption key to determine encrypted verification data. In turn, after said decrypting 155 and prior to said first comparing 151 the determining 150 further comprises applying 157 another private algorithm that corresponds with said proprietary algorithm to said decrypted data to obtain said algorithmically-determined data for use in said first comparing 151.

In such implementations, the method may further comprise the maintaining 160 first count data in the memory in the memory of the IC chip of the verification object, as referenced above, wherein the first count data is indicative of a number of times that the product authenticity data has been utilized to determine said verification data, and wherein the microprocessor of the IC chip of the verification object is operable to utilize at least the first count data and the stored product authenticity data to determine said verification data. As noted, the IC chip may include a counter for such purposes. In turn, the determining 150 may include second comparing 153 a second predetermined portion of said one of said decrypted test data or said algorithmically-determined data that is algorithmically determined utilizing the decrypted test data, with stored second count data to identify the presence or absence of a second predetermined association, wherein the stored second count data is indicative of a number of times that the first comparing 151 has been completed that identifies the presence or absence of the first predetermined association. As noted, determination that said test data is associable with said product authenticity data may require the first comparing 151 and the second comparing 153 to identify the presence of the first predetermined association and the second predetermined association, respectively.

In one approach, prior to the storing step 110, the method may include generating at said verification server said product authenticity data for use in said storing. In such embodiments, the first party noted above may provide multiple functions, including performance of the generating, storing 110, receiving 120 and sending steps 140, as well as at least a portion of the determining 150 step. In conjunction with the generating step, the product authenticity data may comprise or be generated utilizing data provided by an authorized source or designee thereof for an authentic product.

As noted, the electronic device may be a mobile computing device, and the method may provide 132 a mobile product authenticity application for download and storage by the mobile computing devices. In conjunction with such embodiments, the mobile product authentication application may be operable to configure the mobile computing device to:

authenticate the mobile computing device to the IC chip of the verification object via a contactless interface;

obtain the verification data as test data from the IC chip as physically associated with the product of interest via said contactless interface;

send a message corresponding with the inbound message comprising the verification data to a mobile application server via the communications network;

receive a message corresponding with the outbound message verification server from the mobile application server via the communications network; and/or, provide a user-discernable output indicative of one of verification of authenticity of the product of interest or non-verification of authenticity of the product of interest (e.g. a visual output at a display and/or an audible output).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A method for use in verification of authenticity of a product, comprising:
   storing product authenticity data in an integrated circuit chip of a verification object, wherein a microprocessor of the integrated circuit chip is operable to utilize at least the stored product authenticity data to determine verification data;
   receiving an inbound message at a verification server from a remote electronic device, wherein the inbound message comprises test data obtained by the remote electronic device from an integrated circuit chip physically associated with a product of interest;
   sending an outbound message from the verification server to the remote electronic device in response to receipt of the inbound message, wherein the outbound message is indicative of a either verification of authenticity of the product of interest when the test data is associable with the product authenticity data or non-verification of authenticity of the product of interest when the test data is not associable with the product authenticity data,
   wherein determining the associability of the test data with the product authenticity data comprises first comparing first data associated with the test data with data associated with separately stored authenticity data to identify the presence or absence of a first predetermined association; and
   maintaining first count data in the verification object, wherein the first count data is indicative of a number of times that the product authenticity data has been utilized to determine the verification data, and
   wherein the determining further comprises second comparing second data associated with the test data with data associated with separately-stored second count data to identify the presence or absence of a second predetermined association, wherein the stored second count data is indicative of a number of times that the first comparing has been completed to identify the presence or absence of the first predetermined association.

2. A method as recited in claim 1, wherein after the storing the method further comprises:
   physically associating the verification object with an authentic product that corresponds with the product authenticity data.

3. A method as recited in claim 2, wherein at least the storing is completed by a first party and at least the physically associating is completed by a second party, and wherein the second party is an authorized source or designee thereof for the authentic product.

4. A method as recited in claim 3, wherein the storing is completed pursuant to a contract between the first party and said second party.

5. A method as recited in claim 2, wherein after the receiving and prior to the sending the method further comprises:
   determining whether the test data is associable with the product authenticity data, wherein the outbound message is based upon the determining.

6. A method as recited in claim 5, wherein at least portion of the determining is completed at the verification server.

7. A method as recited in claim 6, wherein at least another portion of the determining is completed at a source server controlled by an authorized source or designee thereof for the authentic product.

8. A method as recited in claim 5, wherein the storing further comprises:
   storing a private encryption key in the IC chip of the verification object, wherein a microprocessor of the IC chip of the verification object is operable to utilize at least the stored product authenticity data to determine verification data that is encrypted utilizing the stored private encryption key with an encryption algorithm;
   and wherein the determining comprises:
   decrypting the test data to obtain decrypted test data utilizing a stored private decryption key with a decryption algorithm that correspond with the encryption key and the encryption algorithm, respectively; and,
   first comparing at least a first predetermined portion of one of the decrypted test data or data that is algorithmically determined utilizing the decrypted test data, with separately-stored authenticity data, or data algorithmically determined using the separately-stored authenticity data, to identify the presence or absence of a first predetermined association, wherein a determination that the test data is associable with the product authenticity data requires the first comparing to identify the presence of the first predetermined association.

9. A method as recited in claim 8, wherein the storing further comprises:
   storing a private algorithm in the memory of the IC chip of the verification object, wherein the microprocessor of the IC chip of the verification object is operable to first apply the stored private algorithm to at least the stored product authenticity data to obtain the verification data, and to second apply the encryption algorithm with the stored encryption key to determine the encrypted verification data;
   and wherein after the decrypting and prior to the first comparing the determining further comprises:
   applying another private algorithm that corresponds with the private algorithm to the decrypted test data to obtain the algorithmically-determined data for use in the first comparing.

10. A method as recited in claim 8, further comprising:
    maintaining first count data in the memory in the memory of the IC chip of the verification object, wherein the first count data is indicative of a number of times that the product authenticity data has been utilized to determine the verification data, and wherein the microprocessor of the IC chip of the verification object is operable to utilize at least the first count data and the stored product authenticity data to determine the verification data;

and wherein the determining further comprises:

second comparing a second predetermined portion of the one of the decrypted test data or the algorithmically-determined data that is algorithmically determined utilizing the decrypted test data, with separately-stored second count data to identify the presence or absence of a second predetermined association, wherein the stored second count data is indicative of a number of times that the first comparing has been completed that identifies the presence or absence of the first predetermined association, wherein a determination that the test data is associable with the product authenticity data requires the first comparing and the second comparing to identify the presence of the first predetermined and the second predetermined association, respectively.

11. A method as recited in claim 1, wherein prior to the storing the method further comprises:

generating at the verification server the product authenticity data for use in the storing.

12. A method as recited in claim 1, wherein the product authenticity data comprises or is generated utilizing data provided by an authorized source or designee thereof for an authentic product.

13. A method as recited in claim 1, wherein the verification server and the electronic device are each interconnectable to a communications network at remotely located nodes, and wherein the in-bound message is received by the verification server and the outbound message is sent by the verification server via the communications network.

14. A method as recited in claim 13, wherein the communications network includes the Internet, and further comprising:

providing a mobile product authenticity application at a mobile application server for download and storage by mobile computing devices interconnectable to the Internet for wireless communications, wherein the electronic device is a mobile computing device having the mobile product authentication application downloaded thereto, and wherein the receiving and sending require use of the mobile product authenticity application at the mobile computing device.

15. A method as recited in claim 14, wherein the mobile product authentication application is operable to configure the mobile computing device to:

authenticate the mobile computing device to the integrated circuit chip of the verification object via a contactless interface;

obtain the verification data from the IC chip physically associated with the product of interest via said contactless interface;

send a message corresponding with the inbound message comprising the verification data to a mobile application server via the communications network;

receive a message corresponding with the outbound message verification server from the mobile application server via the communications network; and, provide a user-discernable output indicative of one of verification of authenticity of the product of interest or non-verification of authenticity of the product of interest.

16. A method as recited in claim 15, wherein the mobile application server is provided by at least one of:

an authorized source or designee thereof for an authentic product, wherein the mobile application server is interconnectable to the communications network to receive messages from and send messages to the mobile computing device, and to send the corresponding inbound message and receive the corresponding outbound message from the verification server; and, the verification server.

17. A method as recited in claim 14, wherein the verification object further comprises:

a substrate to which the integrated circuit chip of the verification object is supportably interconnected; and, an antenna supportably interconnected to the substrate and operatively interconnected or interconnectable to the integrated circuit chip of the verification object to receive/transmit wireless signals; and, wherein the mobile computing device is operable for near field communications with the integrated circuit chip of the verification object via the antenna thereof.

18. A method as recited in claim 1, wherein the storing further comprises:

storing account-related data in the integrated circuit chip of the verification object, wherein access to the stored account-related data requires presentation of issuer key data to the integrated circuit chip of the verification object at a point-of-sale location of an authentic product, and wherein the stored account-related data is indicative of a benefit to be provided to a purchaser of the authentic product.

19. A system for use in verification of authenticity of a product, comprising:

at least one encoding device for storing product authenticity data in memory of an integrated circuit chip of a verification object to be physically associated with a predetermined authentic product;

at least one secure encoding server for providing the authenticity data to the at least one encoding device;

at least one verification server, interconnectable to a communications network, for receiving an inbound message via the communications network from at least one electronic device that includes test data obtained by the at least one electronic device from a product of interest, and for sending an outbound message via the communications network to the electronic device indicative of verification or non-verification of product authenticity of the product of interest when the test data is associable with the product authenticity data, wherein the at least one verification server comprises at least one processor configurable by preprogrammed instructions for first comparing first data associated with the test data with data associated with separately stored authenticity data to identify the presence or absence of a first predetermined association, wherein the integrated circuit chip of the verification object is operable to determine verification data using the stored product authenticity data and first count data stored in the memory that is indicative of a number of times that the product authenticity data has been utilized by the integrated circuit chip to determine verification data, and wherein the at least one processer of the at least one verification server is further configurable by preprogrammed instructions for second comparing second data associated with the test data with data associated with separately stored authenticity data to identify the presence or absence of a second predetermined association, wherein the separately-stored second count data is indicative of a number of times that the first comparing has been completed to indicate the presence or absence of the first predetermined association with the corresponding separately-stored authenticity data.

20. A system as recited in claim 19, wherein the separately-stored authenticity data is stored at the at least one verification server.

21. A system as recited in claim 19, wherein the separately-stored authenticity data is stored at one or more source server, separate from the at least one verification server, wherein the at least one verification server is operable to receive the separately-stored authenticity data from the one or more source server.

22. A system as recited in claim 19, wherein the separately-stored second count data is maintained and stored at the at least one verification server.

23. A system as recited in claim 19, wherein the separately-stored second count data is maintained and stored at one or more source server, separate from the at least one verification server, wherein the at least one verification server is operable to receive the separately-stored authenticity data from the one or more source server.

24. A system as recited in claim 19, wherein the integrated circuit chip of the verification object is operable to utilize the stored product authenticity data and stored first count data to determine verification data that is encrypted utilizing an encryption key stored in the memory with an encryption algorithm, and wherein the at least one processor of the at least on verification server is configurable by preprogrammed instructions to decrypt the test data to obtain decrypted test data utilizing a separately-stored private decryption key with a decryption algorithm that correspond with the encryption key and the encryption algorithm, respectively, wherein the decrypted test data is utilized in the first comparing by the at least one processor.

25. A system as recited in claim 19, wherein the integrated circuit chip of the verification object is operable to utilize the stored product authenticity data to determine verification data that is encrypted utilizing an encryption key stored in the memory with an encryption algorithm, and wherein the at least one processor of the at least on verification server is configurable by preprogrammed instructions to decrypt the test data to obtain decrypted test data utilizing a separately-stored private decryption key with a decryption algorithm that correspond with the encryption key and the encryption algorithm, respectively, wherein the decrypted test data is utilized in the first comparing by the at least one processor.

26. A system as recited in claim 19, wherein the integrated circuit chip of the verification object is operable to utilize the stored product authenticity data to determine verification data, wherein the electronic device is a mobile computing device, and further comprising:
    a mobile application server operable to provide a mobile product authentication application to the mobile computing device, wherein the mobile product authentication application is operable to configure the mobile computing device to:
        authenticate the mobile computing device to the IC chip of the verification object via a contactless interface;
        obtain the verification data as test data from the IC chip as physically associated with the product of interest via the contactless interface;
        send a message corresponding with the inbound message comprising the verification data to a mobile application server via the communications network;
        receive a message corresponding with the outbound message verification server from the mobile application server via the communications network; and,
        provide a user-discernable output indicative of one of verification of authenticity of the product of interest or non-verification of authenticity of the product of interest.

\* \* \* \* \*